United States Patent [19]

Ryhänen

[11] Patent Number: 5,531,128
[45] Date of Patent: Jul. 2, 1996

[54] CAPACITIVE TRANSDUCER FEEDBACK-CONTROLLED BY MEANS OF ELECTROSTATIC FORCE AND METHOD FOR CONTROLLING THE PROFILE OF THE TRANSDUCING ELEMENT IN THE TRANSDUCER

[75] Inventor: Tapani Ryhänen, 00270 Helsinki, Finland

[73] Assignee: Vaisala Oy, Helsinki, Finland

[21] Appl. No.: 293,463

[22] Filed: Aug. 19, 1994

[30] Foreign Application Priority Data

Aug. 20, 1993 [FI] Finland ............................. 933670

[51] Int. Cl.$^6$ ..................................... G01C 1/00
[52] U.S. Cl. ........................................ 73/862.623
[58] Field of Search ................ 73/718, 724, 517 B, 73/862.626, 514.18, 514.21, 862.622

[56] References Cited

U.S. PATENT DOCUMENTS

| | | | |
|---|---|---|---|
| 3,229,530 | 1/1966 | Wilcox et al. | 73/517 B |
| 3,397,278 | 8/1968 | Pomerantz . | |
| 3,602,047 | 8/1971 | Kistler | 73/718 |
| 4,257,274 | 3/1981 | Shimada et al. . | |
| 4,332,000 | 5/1982 | Petersen . | |
| 4,340,409 | 7/1982 | Brooks et al. | 73/718 |
| 4,386,453 | 6/1983 | Giachino et al. . | |
| 4,390,925 | 6/1983 | Freud . | |
| 4,589,054 | 5/1986 | Kuisma . | |
| 4,594,639 | 6/1986 | Kuisma . | |
| 4,628,403 | 12/1986 | Kuisma . | |
| 4,679,434 | 7/1987 | Stewart . | |
| 4,831,492 | 5/1989 | Kuisma . | |
| 4,996,627 | 2/1991 | Zias et al. . | |
| 5,019,783 | 5/1991 | Cadwell . | |
| 5,028,876 | 7/1991 | Cadwell . | |
| 5,048,165 | 9/1991 | Cadwell . | |
| 5,085,070 | 2/1992 | Miller et al. | 73/724 |
| 5,095,750 | 3/1992 | Suzuki et al. . | |

OTHER PUBLICATIONS

Wise, Analog Data Acquisition Circuits, Proc. Advances in Analogue Circuit Design. (1993).
"Design and Test of a Precision Servoaccelerometer with Digital output", by Messrs. de Coulon, Smith, Hermann, Chevroulet, Rudolf; CSEM Swiss Center for Electronics and Microtechnology, Inc.; The 7th International Conference on Solid-State Sensors and Actuators, pp. 832–835; 1993.
"Analog Data Acquisition Circuits in Integrated Sensing Systems", Advances in Analogue Circuit Design; Messrs. Sansen, Huijsing, van de Plassche; Faculty Club Leuven; Apr. 6–8, 1993.
"Electrostatically Force-Balanced Silicon Accelerometer" by Keith Warren; Litton Guidance & Control Systems; Journal of the Institute of Navigation, vol. 38, No. 1, Spring 1991; pp. 91–99.

*Primary Examiner*—Richard Chilcot
*Assistant Examiner*—Ronald Biegel

[57] ABSTRACT

The invention is related to a capacitive transducer feedback-controlled by means of electrostatic force and a method for controlling said transducer. The transducer comprises a body part (8) supporting a dynamically moving transducing element sensitive to the variable being measured, said transducing element being, e.g., a diaphragm (9) or a reference mass (36) supported by a bending beam (37), said element further being at least on its surface electrically conductive to the end of forming a first electrode (9, 36) of the transducer, and the transducer further comprising at least two second, planar electrodes (5, 6) which are placed on the same side with regard to the transducing element (9, 37). According to the invention, the second electrodes (5, 6) have at least essentially equal effective areas to the end of measuring the profile of the transducing element (9, 37) and controlling the same to an exactly defined geometric state.

20 Claims, 7 Drawing Sheets

5,531,128

CAPACITIVE TRANSDUCER FEEDBACK-CONTROLLED BY MEANS OF ELECTROSTATIC FORCE AND METHOD FOR CONTROLLING THE PROFILE OF THE TRANSDUCING ELEMENT IN THE TRANSDUCER

FIELD OF THE INVENTION

The invention is related to a capacitive transducer employing feedback-control by means of electrostatic force.

The invention also concerns a method for controlling the profile of the transducing element in a transducer feedback-controlled by means of electrostatic force.

BACKGROUND OF THE INVENTION

The following publications are cited as reference to the prior art:

USA patents:

[p1] U.S. Pat. No. 4,257,274 (Shimada et al)
[p2] U.S. Pat. No. 4,386,453 (Gianchino et al.)
[p3] U.S. Pat. No. 4,332,000 (Petersen),
[p4] U.S. Pat. No. 4,390,925 (Freud)
[p5] U.S. Pat. No. 3,397,278 (Pomerantz)
[p6] U.S. Pat. No. 4,589,054 (Kuisma)
[p7] U.S. Pat. No. 4,628,403 (Kuisma)
[p8] U.S. Pat. No. 4,594,639 (Kuisma)
[p9] U.S. Pat. No. 4,83 1,492 (Kuisma)
[p10] U.S. Pat. No. 4,996,627 (Zias et at.)
[p11] U.S. Pat. No. 5,019,783 (Cadwell)
[p12] U.S. Pat. No. 5,028,876 (Cadwell)
[p13] U.S. Pat. No. 5,048,165 (Cadwell)
[p14] U.S. Pat. No. 4,679,434 (Stewart)
[p15] U.S. Pat. No. 5,095,750 (Suzuki et al.)

Scientific papers:

[a1] K. Warren, Navigation 38, 91 (1991).
[a2] K. D. Wise, in Proceedings of the Workshop Advances in Analogue Circuit Design, Katholieke Universiteit Leuven, April 1993.
[a3] Y. de Coulon et al., Design and Test of a Precision Servoaccelerometer with Digital Output, The Proceedings of the 7th International Conference on Solid-State Sensors and Actuators, pp. 832–835, 1993.

Cited publications [p1–p10] describe capacitive pressure transducer structures in which the silicon diaphragm acting as the transducing electrode is flexible relative to a rigid metal electrode. Cited patents [p1, p10] disclose particularly a transducer structure suited for measuring the pressure difference imposed on the transducer diaphragm by the pressures acting on the different sides of the diaphragm. Such a transducer structure is termed a differential pressure transducer.

Prior-art differential pressure transducer constructs can be divided into asymmetrical and symmetrical structures. In an asymmetrical structure [cf. p1, p8], the capacitance change is measured only between the pressure-sensitive diaphragm and a single metal electrode. In a symmetrical structure [cf. p1, p4, p10], the capacitance measurement is performed between the pressure-sensitive diaphragm and metal electrodes placed on both sides of the diaphragm, which arrangement renders differential capacitance measurement possible.

In structures based on the flexure of the pressure-sensitive diaphragm under pressure, temperature dependence is approximately a linear function of the deflection of the diaphragm. A major portion of the temperature dependence in a symmetrical differential pressure transducer structure is constituted by the difference of the thermal expansion constants of the silicon diaphragm and the substrate.

The measurement circuit in which the differential pressure transducer is employed is based on conventional capacitance measurement. Numerous measurement techniques are known. In a measurement circuit employing a symmetrical differential pressure transducer, a transfer function is obtained which is proportional to differential capacitance. A benefit thereof is that a vastly improved linearity results about the zero point in relation to an asymmetric transducer structure.

The literature of the art recognizes measurement systems for silicon micromechanical structures [cf. p14, p15, a1] based on the force equilibrium principle. The mechanical force acting on the transducer is compensated by an electrostatically controllable force. The mutual force of attraction generated by an electric field between two electrodes can be computed from the equation:

$$F_{electric} = \int_A \frac{\epsilon_0 \epsilon_r U^2 dA}{2d^2},$$

where U is the electrical potential difference between the electrodes, d is the distance between the electrodes, dA is an infinitesimal area element of the electrode surface and $\epsilon_0 \epsilon_r$ is the dielectric constant of the insulating medium. Characteristically, the voltage-force transfer function is nonlinear relative to the feedback voltage. However, in a symmetrical structure the transfer function can in principle be linearized using two different techniques. When the metal electrodes 74 are biased as illustrated in FIG. 7b by applied voltages 72 ($V_{bias}$) and 73 ($-V_{bias}$) and a feedback voltage 71 (V) is applied to the center electrode 75, the resulting electrostatic net force is $$F_{electric} = \int_A \frac{\epsilon_0 \epsilon_r (V+V_{bias})^2}{2d^2} dA - \int_A \frac{\epsilon_0 \epsilon_r (V-V_{bias})^2}{2d^2} dA = \int_A \frac{2\epsilon_0 \epsilon_r V V_{bias}}{d^2} dA.$$

The voltage applied to the center electrode 75 is taken to a preamplifier for further processing. High-pass filtering of the measurement signal is provided by an RC circuit 78.

An alternative possibility illustrated in FIG. 7a is to connect the bias voltages 72 ($V_{bias}$) and 73 ($-V_{bias}$) to the metal electrodes 74, then to sum the electrostatic force feedback voltage 71 (V) to the electrodes, and to take the center electrode 75 to ground potential via a resistor 77. The outcome is exactly the same as in the first arrangement: the electrostatically imposed force is a linear function of the voltage applied between the electrodes. The output voltage of the preamplifier 76 is taken to a feedback circuit (not shown). The feedback circuit is configured to control the output voltage to zero.

The electrostatic feedback force can also be generated by means of a pulsed voltage. If the pulse rate of the applied voltage is essentially above the transducer dynamic response cutoff frequency (that is, the lowest natural frequency of the transducer), the transducing electrode is subjected to an average electrostatic force $$F_{av} \approx \frac{\epsilon_0 \epsilon_r}{2d^2} \cdot U_{pulse}^2 \cdot T_{pulse} f_{pulse}$$

where $U_{pulse}$ is the pulse amplitude, $T_{pulse}$ is the pulse width and $f_{pulse}$ is the frequency (repetition rate) of the pulsed control voltage. The electrostatic feedback force can then be controlled by the pulse amplitude, width and/or rate. When using constant-amplitude pulses with either pulse-width or pulse-rate modulation, a linear relationship is obtained between the pulse width or rate and the average electrostatic force [cf. a3, p15]. The feedback arrangement for the transducer according to the invention can be implemented using either a DC voltage or a pulsed voltage. Feedback by means of a pulsed control voltage is particularly applicable to asymmetric structures facilitating a linear transfer function.

Electrostatic force feedback has been applied to measurement circuits built around micromechanical acceleration transducers. The same principle can be employed in measurement circuits built around differential pressure transducers. For a symmetrical transducer controlled to the force equilibrium, the output voltage is $$V_{out} \approx \frac{g^2}{2\epsilon_r \epsilon_0 V_{bias}} \Delta p,$$

where $\Delta p$ is the differential pressure acting across the diaphragm and g is the gap distance between the electrodes. If a control voltage span of ±10 V is available and a differential pressure measurement range of ±500 Pa is desired, the mutual distance between the electrodes shall be 2 µm or less. In practice, such small dimensions required and the narrow differential pressure range available have curtailed the application of an electrostatic force feedback-controlled differential pressure transducer. However, a differential pressure transducer based on controlled force equilibrium excels by its linearity and low temperature dependence, since the diaphragm profile can be kept unflexed by virtue of the applied feedback.

The above-given equation is, however, only valid for an ideal transducer structure namely, the mutual distances of the transducer pressure-sensitive diaphragm 75 to both electrodes 74 must be equal. If the mutual distances of diaphragm to the electrodes are unequal, the result is that the zero position of the difference capacitance $\Delta C = C_1 - C_2$ does not coincide with the unflexed position of the transducer diaphragm. Any deviation from the ideal condition causes higher temperature dependence and nonlinearity of the transducer.

In a feedback-controlled micromechanical transducer, two separate metal electrodes are preferably used: a first electrode for feedback and a second electrode for capacitance measurement [cf. p15, a2]. This arrangement aims at a more straightforward measurement circuitry by virtue of separating the feedback voltage and the measurement signal from each other.

SUMMARY OF THE INVENTION

It is an object of the present invention to achieve an entirely novel type of capacitive transducer with feedback by means of an electrostatic force and a method for controlling the profile of the active element in the transducer.

The invention is based on fabricating at least approximately equal effective areas for the second, fixed subelectrodes which are used for measuring the profile of the transducing element and controlling the same to an exactly defined geometric profile.

Analogously, the method according to the invention is based on controlling the transducing element to an exactly defined geometric profile.

The invention offers significant benefits, such as by controlling the transducing element to an unflexed state, the undesirable temperature sensitivity of a capacitive transducer can be minimized. By virtue of the nonrestricted control of the transducing element profile, the effect of any dominating error source can be minimized as desired. The approach according to the invention reduces the error exactly to a second order effect. A feedback system according to the invention for controlling the transducing element profile further prevents changes in the dielectric properties of the transducer material from affecting the geometric status of the feedback-controlled measurement setup.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 3:
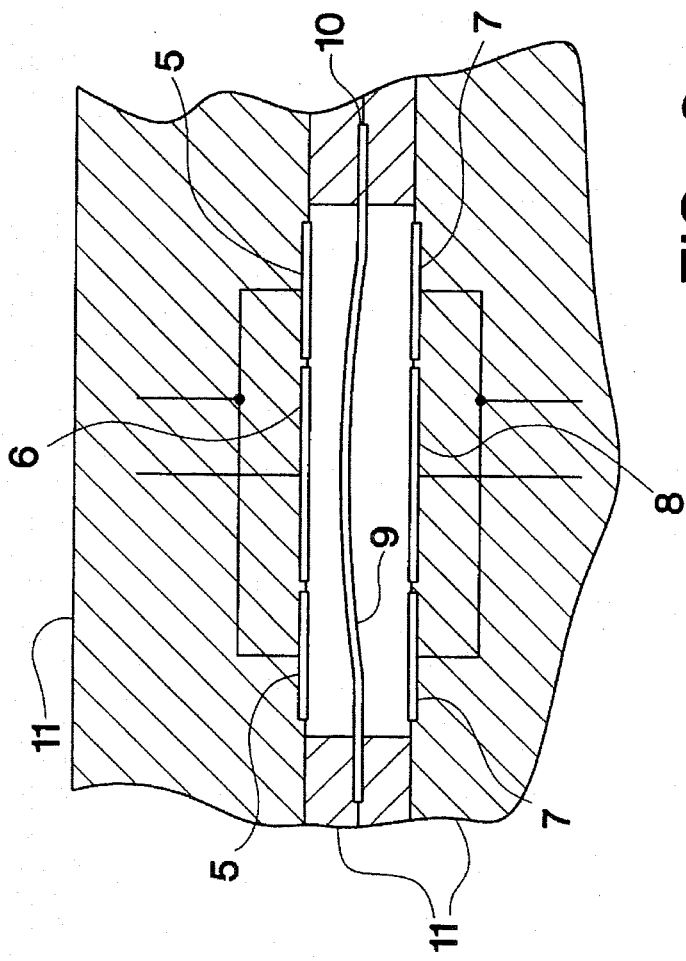
FIG. 3 is a diagrammatic side view of a symmetric transducer structure according to the invention.
Figure 1:
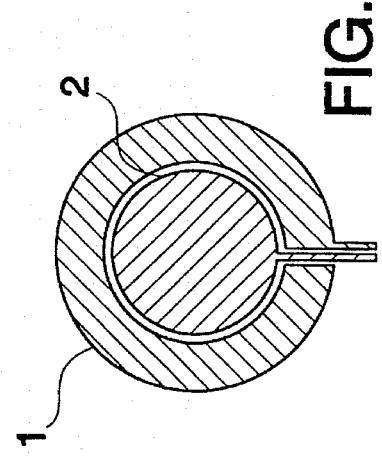
FIG. 1 is a top view of an electrode layout according to the invention.
Figure 2:
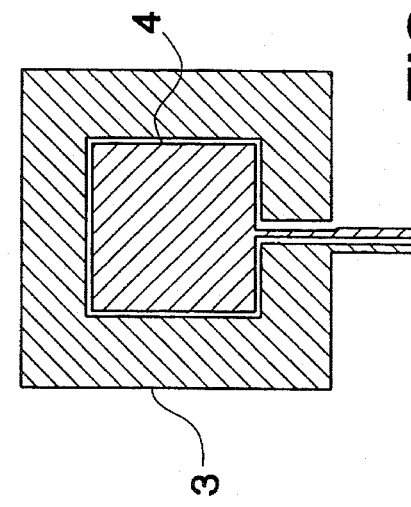
FIG. 2 is a top view of another electrode layout according to the invention.

According to the invention, the second, fixed, metallic electrodes fabricated to the transducer body part are divided into at least two sets of subelectrodes so that the feedback signal is taken common to all sets of subelectrodes, while the sensing measurement signal is applied to the different subelectrodes using desired mutual differential phase shift and amplitude. The differential phase and amplitude control of the sensing measurement signal makes it possible to implement a transfer function that performs appropriate weighting of the different parts of the transducer diaphragm. As a special case the diaphragm surface can be divided into two concentric zones with equal areas. In FIGS. 1, 2 and 3 such metal electrode shapes are shown for circular and square electrode geometries.

The embodiment shown in FIG. 1 comprises a circular center electrode 2 encircled by an annular electrode 1. The electrodes 1 and 2 have equal areas. The areas, however, may vary within manufacturing tolerances.

The embodiment shown in FIG. 2 correspondingly comprises a square center electrode 4 enclosed by a square-frame-shaped electrode 3.

Figure 4:
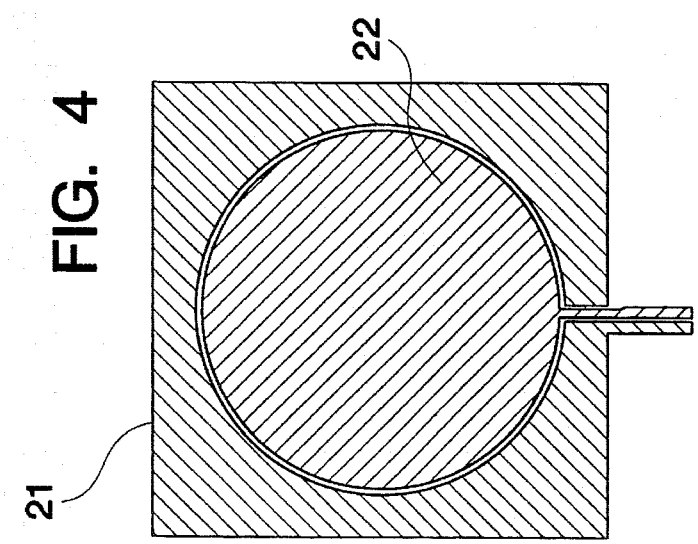
FIG. 4 is a top view of a third embodiment of an electrode layout according to the invention.

A third embodiment of an electrode structure according to the invention is shown in FIG. 4 having the center electrode 22 circular in the same manner as in FIG. 1, and this circular electrode is concentrically enclosed by an electrode 21 having an annular inner perimeter and a square outer perimeter. This geometry offers maximization of the center electrode 22 sensitivity for the measured variable in a structure having a square (not shown) transducing diaphragm supporting the center electrode.

With reference to FIG. 3, a measurement configuration is shown in which three different transfer functions can be realized by feeding the sensing signal $e_s$ to the electrodes of the illustrated structure 11 either in-phase or out-of-phase. The different transfer functions are the following:

$$V_{out}^{(1)} = \frac{(C_6 + C_5) - (C_8 + C_7)}{C_6 + C_5 + C_8 + C_7} e_s;$$

$$V_{out}^{(2)} = \frac{(C_6 - C_8) - (C_7 - C_5)}{C_6 + C_5 + C_8 + C_7} e_s;$$

$$V_{out}^{(3)} = \frac{(C_6 - C_5) + (C_8 - C_7)}{C_6 + C_5 + C_8 + C_7} e_s,$$

where $e_s$ is the sensing signal amplitude, $C_6$ is the capacitance between the fixed electrode terminal 6 and output electrode terminal 10, $C_8$ is the capacitance between the fixed electrode terminal 8 and output electrode terminal 10, $C_5$ is the capacitance between the fixed electrode terminal 5 and output electrode terminal 10 and $C_7$ is the capacitance between the fixed electrode terminal 7 and output electrode terminal 10. The sensing measurement signal is in case$^{(1)}$ taken in-phase to electrode terminals 6 and 5 and out-of-phase to electrode terminals 8 and 7; in case $^{(2)}$ the sensing measurement signal is taken in-phase to electrode terminals 6 and 7 and out-of-phase to electrode terminals 5 and 8; in case $^{(3)}$ the sensing measurement signal is taken in-phase to electrode terminals 6 and 8 and out-of-phase to electrode terminals 5 and 7.

Alternatively, the electrostatic force feedback signal taken to the above-described metal electrode structure is applied at different control voltage levels to the different zones of the electrode structure. This arrangement facilitates a broader control of the sensing electrode contour.

By virtue of the electrode arrangement, the pressure-sensitive silicon diaphragm 9 can be kept unflexed even if the gap distances of the capacitor cavities at opposite sides of the diaphragm are different. Furthermore, the electrode structure of the present invention facilitates the control of the diaphragm contour in an asymmetric transducer. Thus, the temperature dependence of the transducer can be minimized through controlling the diaphragm to an unflexed state. According to a preferred embodiment of the invention, the metal electrodes are divided into two concentric zones of equal areas as shown in FIGS. 1, 2 and 4. Simple measurement of the electrode structure capacitances $C_6$ and $C_5$ or $C_8$ and $C_7$ tells that when the capacitances measured at the same side of the diaphragm are equal, the diaphragm is parallel to the fixed metal electrode. As the diaphragm is flexed under applied pressure, the sensitivity of the center zone capacitance to pressure is appreciably higher than that of the outer zone, and the capacitance difference is detectable.

Figure 6A:
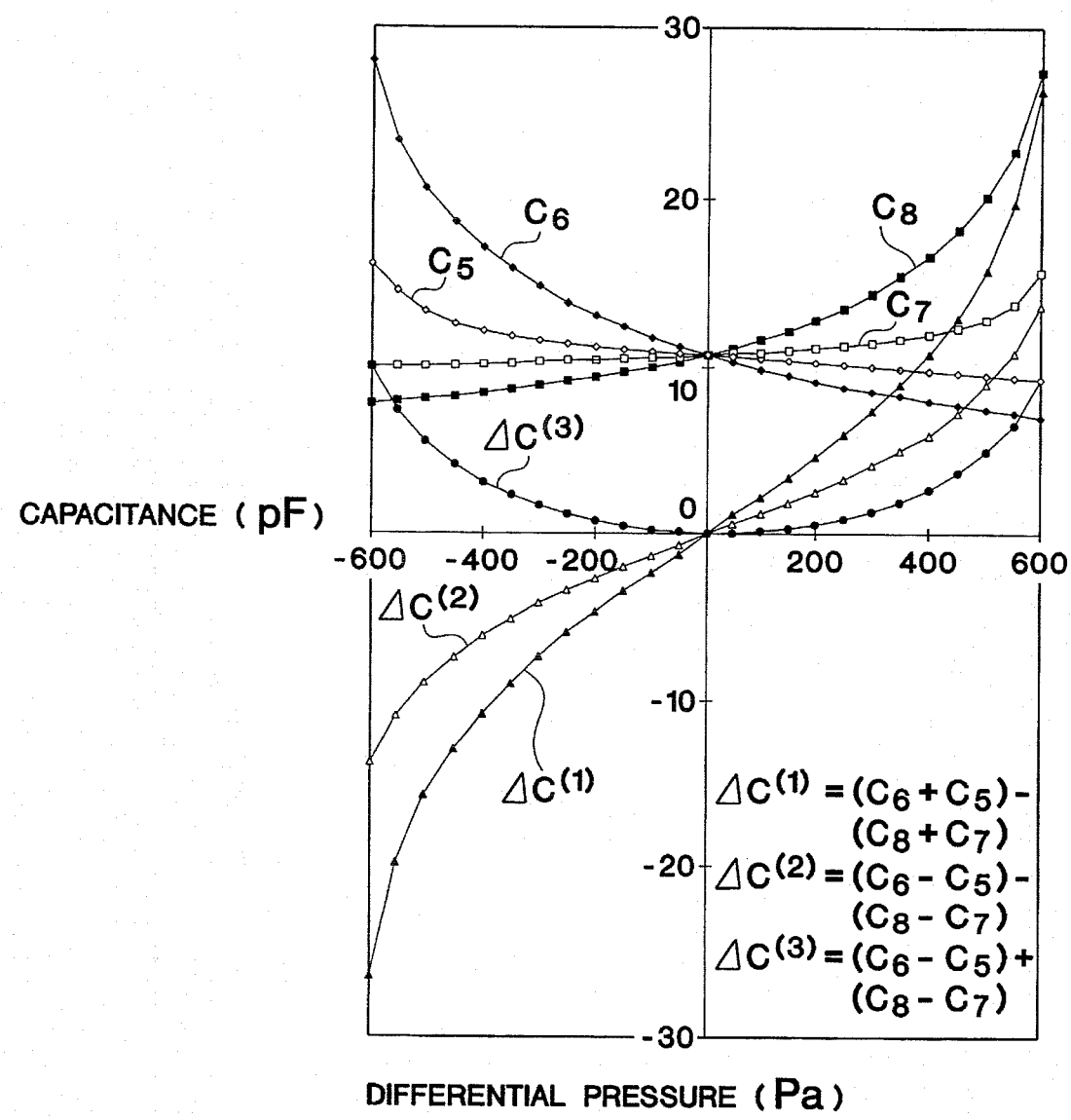
FIGS. 6a and 6b are graphs illustrating the capacitance of transducers according to the invention as a function of differential pressure imposed on the transducer.
Figure 6B:
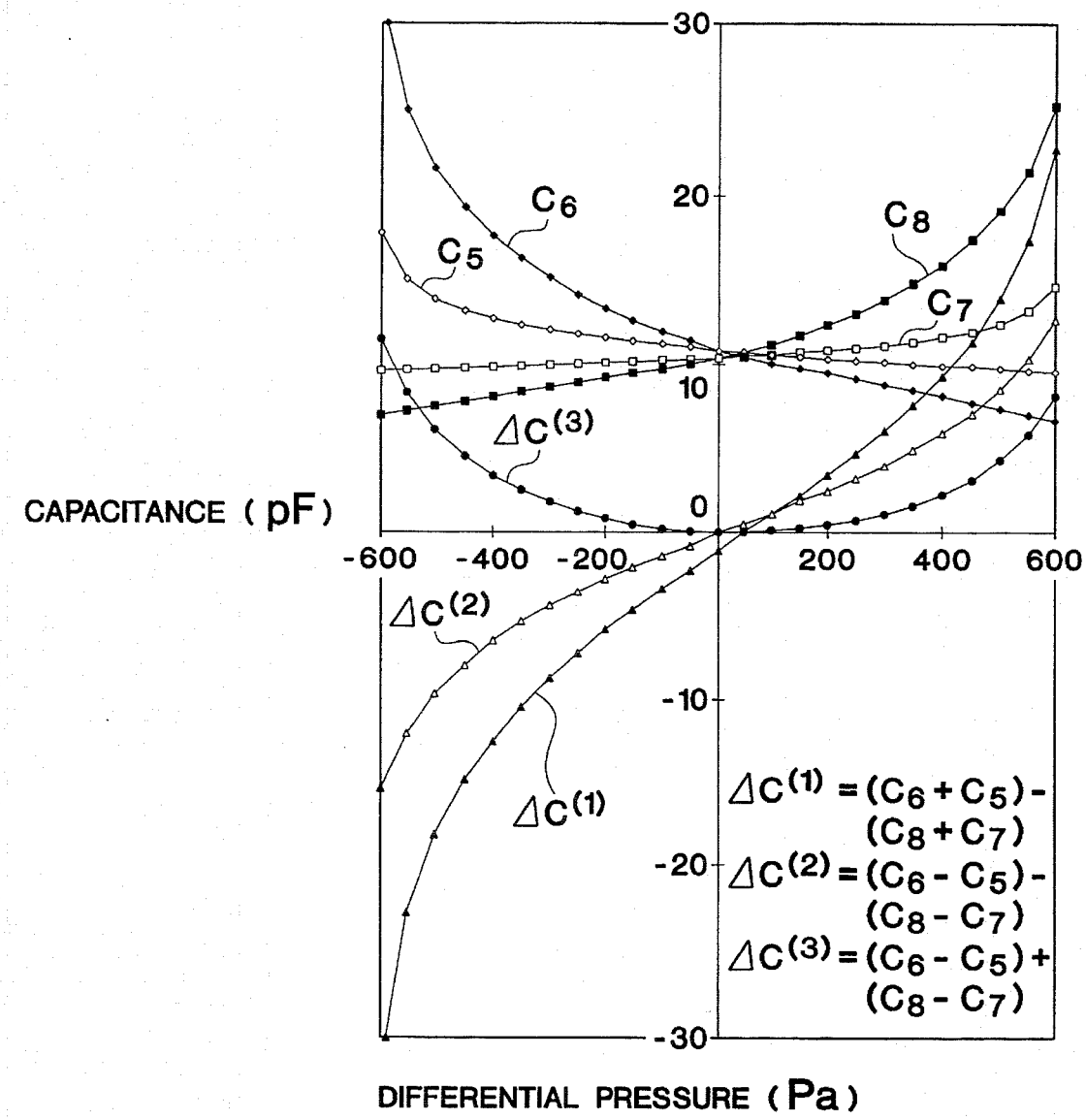

With reference to FIG. 6a, the capacitances $C_6$, $C_5$, $C_8$ and $C_7$ as well as their differences $(C_6-C_5)-(C_8-C_7)$ and $(C_6-C_5)+(C_8-C_7)$ as a function of the differential pressure over the diaphragm are shown for ideally equal gap distances of the capacitors at opposite sides of the diaphragm. With reference to FIG. 6b, the same function is shown for an asymmetrical case. The asymmetry is 100 nm. It can be seen that the capacitance difference $(C_6-C_5)-(C_8-C_7)$ becomes zero for a zero flexure of the diaphragm. The minimum value of the capacitance difference $(C_6-C_5)+(C_8-C_7)$ and zero crossing point of the derivative thereof also coincide with the situation of zero flexure of the diaphragm. The values of the transfer functions $V^{(2)}_{out}$ and $V^{(3)}_{out}$ of the above-described system are zero when the membrane is parallel to the metal electrodes. Moreover, the transfer function $^{(2)}$out is monotonic and thus suited as the indicator of the membrane flexure.

The transducer shown in the diagrams has a square geometry with the metal electrodes shaped as shown in FIG. 2. The transducing diaphragm diameter is 2.4 mm, thickness 10 μm and gap distances of capacitor cavities at both sides 2 μm. The outer metal electrode diameter is 2.2 mm and the inner approximately 1.5 mm.

The most critical dimension in the transducer structure in terms of feedback control is the gap of the capacitor cavity. An assumption is initially made that a control voltage span of ±15 V is available. Then, such a transducer structure in which the capacitor cavities have a gap distance of 2 μm can be used for pressure measurements over a range of ±1000 Pa. The pressure range is directly proportional to the second power of the control voltage and inversely proportional to the second power of the capacitor cavity gap distance. The capacitor cavity gap must be made narrower than 4 μm in order to keep the feedback control voltage limited to a reasonable value and simultaneously achieve a sufficiently large dynamic measurement range. The diaphragm diameter can typically be varied in the range 1–4 mm and the diaphragm thickness is typically below 40 μm.

Figure 5A:
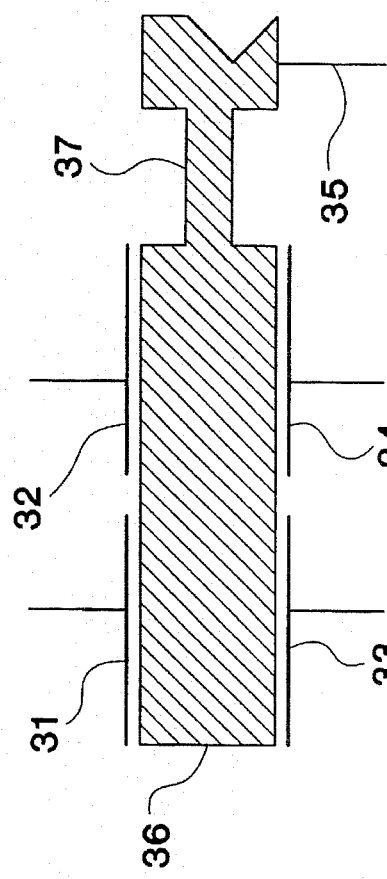
FIG. 5a is a diagrammatic side view of a symmetrical acceleration transducer structure according to the invention.

Given certain changes in the transducer geometry, the above-described principles are also applicable to the measurement circuitry design of an acceleration transducer or any other micromechanical transducer based on a moving element. With reference to FIG. 5, an example thereof is illustrated for the case of an acceleration transducer based on a reference mass 36 supported by a bending cantilever beam 37. Differently from the differential pressure transducer, the sensing electrode structure comprises two equal area parts 31, 32 and 33, 34, which are adjacent to each other. By measuring the differential capacitances of electrodes 31, 32, 33, 34 to the reference mass 36 via the common output electrode 35, it can be determined that the reference mass beam 36 is unbent when the differential capacitance of two capacitors (e.g. $C_{31}-C_{32}$) measured from the same side of the beam is zero.

Figure 5B:
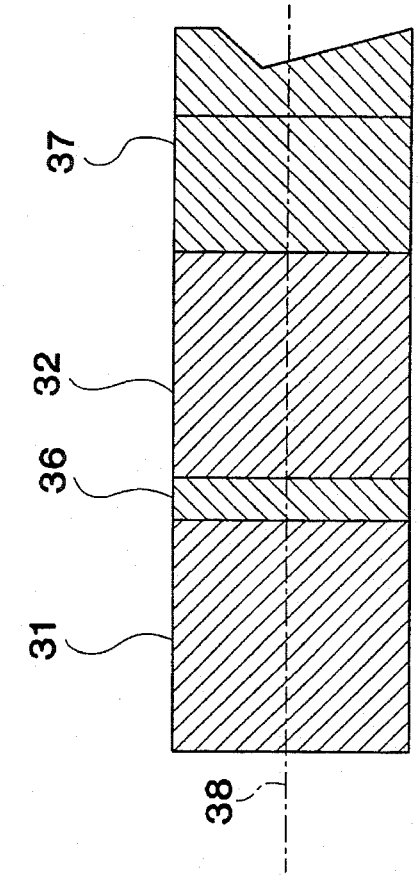
FIG. 5b is a diagrammatic top view of the symmetric acceleration transducer structure illustrated in FIG. 5a sectioned at the level of the upper electrodes.

With reference to FIG. 5b, the electrodes 31 and 32 on the same side of the reference mass 36 must be symmetrically aligned relative to the longitudinal center axis 38 of the reference mass supporting beam.

Figure 7B:
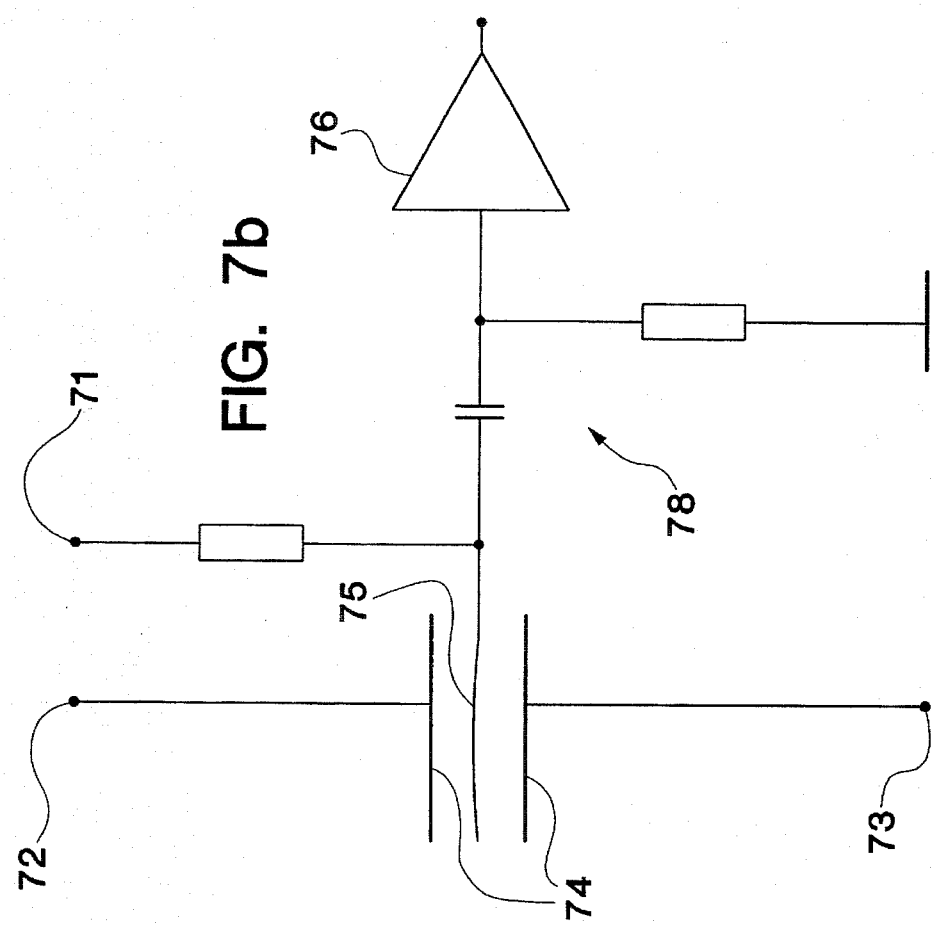
FIGS. 7a and 7b are block diagrams of two alternative embodiments of the feedback electronics circuitry for a symmetrical transducer according to the invention.
Figure 7A:
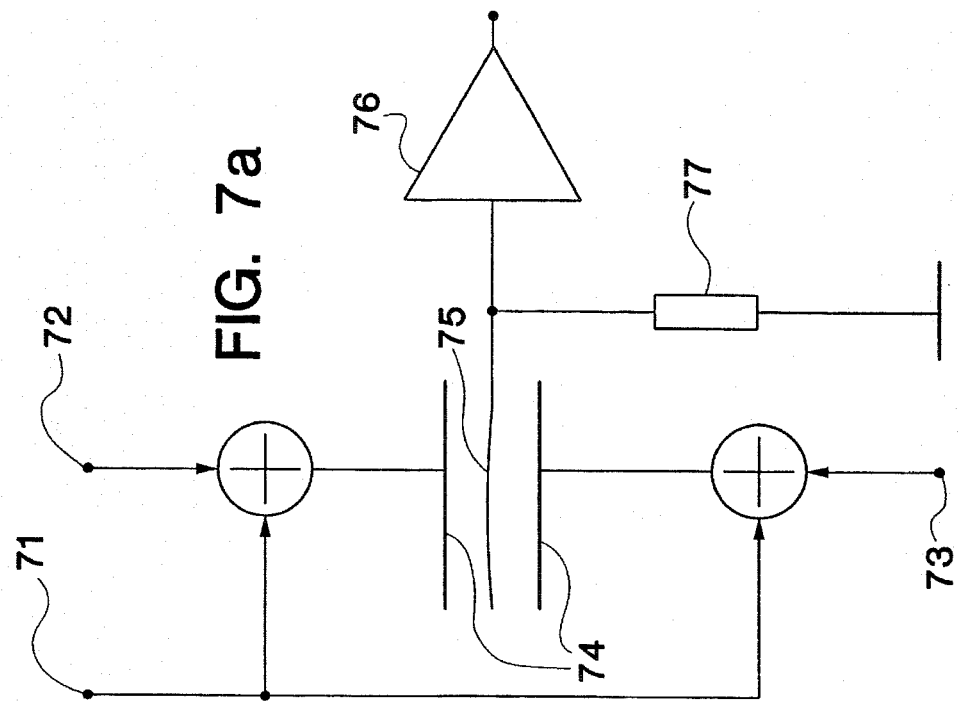

With reference to FIGS. 7a and 7b, a basic block diagram of the feedback control circuit for a feedback-controlled silicon differential pressure transducer is shown. It must be noted, however, that the electrode structure illustrated in the diagrams with only one fixed electrode 74 to both sides of the transducing diaphragm 75 is not suited for a practical implementation of the arrangement according to the invention. Therefore, the diagrams must be understood as mere illustrations of the feedback principle alone. Accordingly, a voltage proportional to the difference of the sensing capacitors is detected from the transducer. The detected voltage is fed to a feedback control circuit whose output voltage is taken back to the transducer. In a force equilibrium, the force accomplished by means of the electric field compensates the mechanical force imposed by the differential pressure on the transducing diaphragm. This principle was already discussed in detail in the general part of the description above.

Figure 8A:
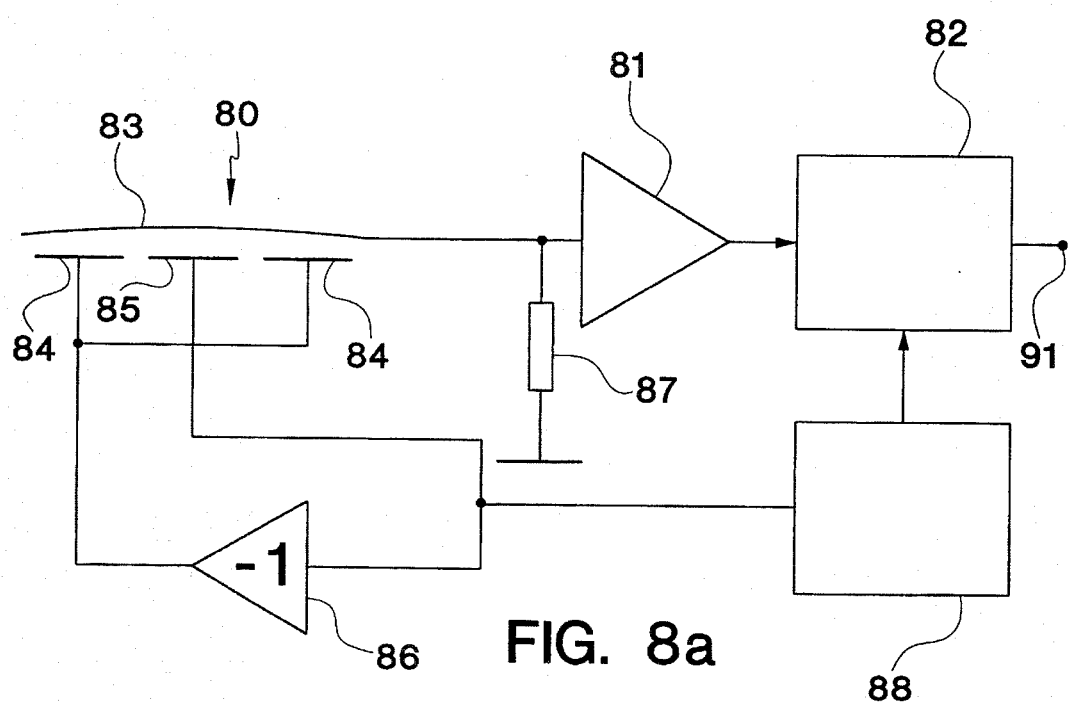
FIGS. 8a and 8b are block diagrams of two alternative embodiments for implementing the measurement circuitry of an asymmetric transducer according to the invention.

With reference to FIG. 8a, an AC voltage is taken from a drive signal source 88 to the fixed electrodes 85 and 84 of an asymmetric transducer structure 80. The polarity of the signal taken to electrodes 84 is inverted by means of an inverting amplifier 86. The transducing membrane 83 is taken via a resistor 87 to ground potential. The capacitance difference of the capacitors formed between the transducing diaphragm 83 and the electrodes 85 and 84 is detected by means of a phase-sensitive detector 82, whose output signal 91 is taken to a feedback circuit (not shown) suited to control the transducing diaphragm 83 to a desired geometric state.

Figure 8B:
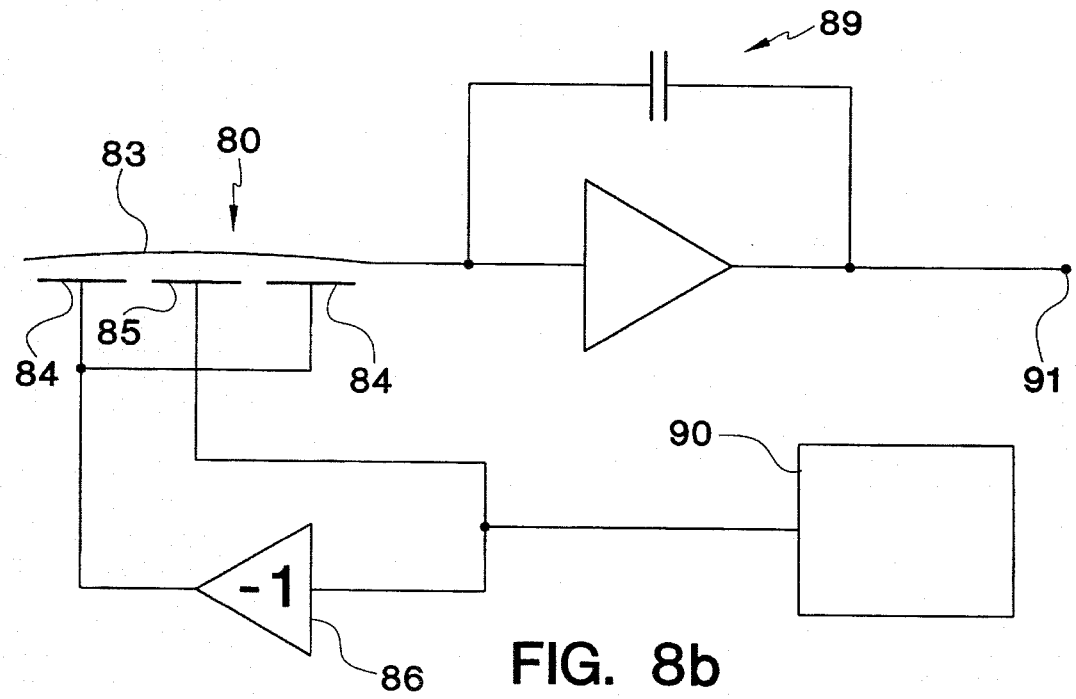

With reference to FIG. 8b, an electric pulse generator 90 is employed to food the electrodes 84 and 85 with a sensing voltage so that the pulse polarity to the electrode 84 is inverted by means of an inverting amplifier. The difference of capacitances $C_{83,85}$ and $C_{83,84}$ is detected by means of a charge amplifier 89, whose output 91 gives a voltage proportional to the charge difference of the capacitances, and this output voltage information is used for the feedback control of the; transducer 80 via electrostatic forces imposed on the transducing element.

Figure 9A:
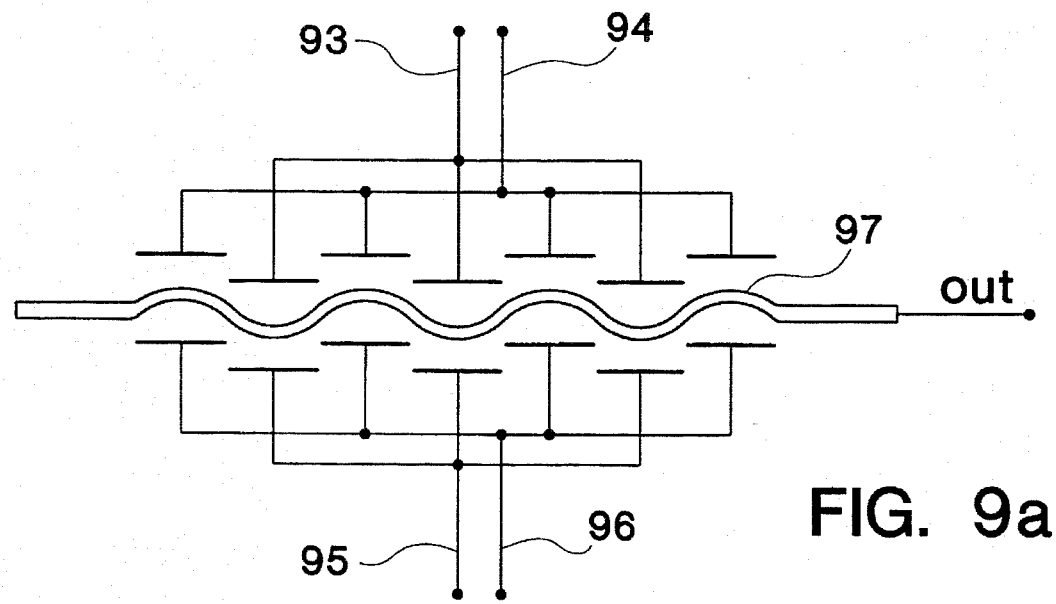
FIGS. 9a 9b are side views of two alternative embodiments for implementing a matrix electrode structure according to the invention.
Figure 9B:
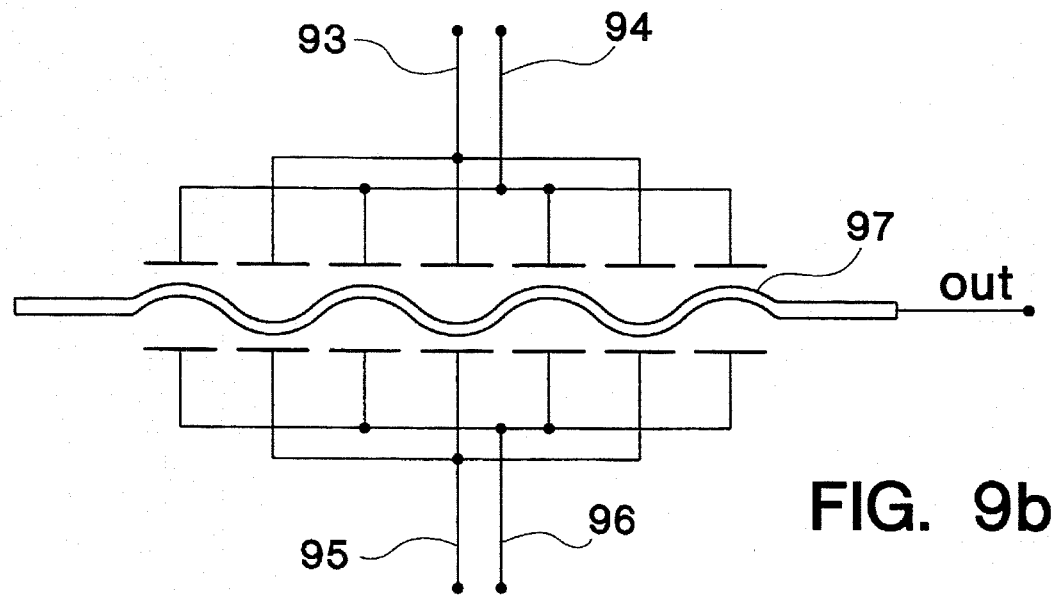

An example for the application of the technique according to the invention to a more complicated control of transducing diaphragm contour is given in FIGS. 9a and 9b illustrating an undulated diaphragm in which the undulations are generated onto an initially flat diaphragm. Such an arrangement is in principle realizable in two different manners:

1) With reference to FIG. 9a, a system is shown in which the capacitor gap distances are staggered in a periodic manner to different depths. Then, the capacitances measured at terminals 93 and 94 (or alternatively, at terminals 95 and 96) become equal when the diaphragm 97 is controlled to periodic undulations. In the diaphragm contour control, the differential voltages applied to the electrode group terminals 93 and 94, as well as 95 and 96, are feedback-controlled. With reference to FIG. 9a, such a situation is attained by applying a higher voltage to electrode terminals 94 and 95 and a lower voltage to electrode terminals 93 and 96. The ratio of the effective areas of the electrodes is then determined by the ratio of the staggered depths of the capacitor gaps. The diaphragm enclosed by the capacitor system can be feedback-controlled to a desired contour by virtue of measuring the differences of the capacitances.

2) With reference to FIG. 9b, a system is shown in which an equivalent result as that described above is attained by controlling the effective area of the electrodes via the transfer function of the measurement circuit transfer function. The differential voltage control is used in the feedback circuit in a similar manner as illustrated in FIG. 9a. The undulated shape of the diaphragm 97 can be used in the control of the diaphragm tensional status. For instance, the diaphragm can be assumed to be under compressive stress initially. Then, the undulated flexing of the diaphragm 97 achieves a tensional stress that compensates the compressive stress. Thus, the stress imposed on the diaphragm can be compensated or even overcompensated to subject the diaphragm to tensional stress.

In accordance with the above-described control arrangements, a term effective area may be defined for the fixed electrodes of the transducer structure. The electronic circuit measuring the capacitance difference of two capacitors $C_1$ and $C_2$ can be assumed to have a transfer function of the form $\alpha C_1 - \beta C_2$, where the coefficients $\alpha$ and $\beta$ are determined by the configuration of the measurement circuit and the capacitor gap distances. If the capacitances $C_1$ and $C_2$ are directly proportional to the areas $A_1$ and $A_2$ of the capacitors, the effective areas of the capacitors can be defined as $\alpha A_1$ and $\beta A_2$. Then, the dual-zone capacitor structures illustrated in FIGS. 1, 2 and 4 are brought to a state of equal effective areas when the following condition is fulfilled:

$$\alpha C_1 - \beta C_2 = 0.$$

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A capacitive transducer, feedback-controlled by electrostatic force, comprising:

a transducing element sensitive to a variable being measured and being at least on its surface electrically conductive to form a first electrode of the transducer, and at least two second electrodes having substantially equal effective areas which are aligned essentially parallel to a longitudinal axis of said transducing element and placed on the same side with respect to said first electrode wherein said second electrodes measure a profile of the transducing element, and a controller controlling said second electrodes to maintain the profile of said transducing element.

2. A transducer as defined in claim 1, wherein said first electrode comprises an essentially planar diaphragm sensitive to the difference of pressure applied to the two sides of said diaphragm wherein said second electrodes are concentrically arranged.

3. A transducer as defined in claim 1 wherein said second electrodes have substantially equal areas.

4. A transducer as defined in claim 1 wherein said second electrodes are constituted by a circular center electrode and at least one concentrically arranged annular electrode.

5. A transducer as defined in claim 1, wherein said second electrodes comprise a square center electrode which is surrounded by at least one square-frame-shaped electrode.

6. A transducer as defined in claim 1, wherein said second electrodes further comprising a circular center electrode surrounded by at least one electrode with a circular inner perimeter and square outer perimeter.

7. A transducer as defined in claim 1 wherein said second electrodes are placed on both sides with respect to said first electrode.

8. A transducer as defined in claim 1, said transducing element further comprising a reference mass supported by a flexible cantilever beam such that said flexible cantilever beam is sensitive to an acceleration imposed on said reference mass, wherein said second electrodes are arranged substantially symmetrical relative to and along a longitudinal center axis of said reference mass.

9. A transducer as defined in claim 8 wherein said second electrodes are aligned on both sides of said beam and said reference mass.

10. A transducer as defined in claim 1, wherein said second electrodes are further comprised of a multiple element matrix organized into at least two sets of subelectrodes having substantially equal effective areas.

11. A method for controlling the geometric profile of a movable transducing element in a capacitive transducer comprising the steps of:

measuring the geometric profile of the movable transducing element with at least two second electrodes which are aligned essentially parallel to a longitudinal axis of the movable element and are placed on the same side with respect to the movable transducing element, generating an electric transducer potential in the movable transducing element, applying an opposed electric potential to the at least two second electrodes to generate an electric field between the movable transducing element and the two second electrodes, and controlling the geometric profile of the movable transducing element using at least one of the second electrodes by varying the electric transducer potential in relation to the opposed electric potential.

12. A method as defined in claim 11, further comprising keeping the movable transducing element in a nondeviated state by measuring the profile of the movable transducing element with the second electrodes and then using the profile measurement information in the control step for controlling the electric field imposed by the at least two second electrode.

13. A method as defined in claim 11, further comprising adapting the second electrodes to have a plurality of second electrodes which have equal areas, measuring the mutual capacitances formed between the second electrodes and the movable transducing element, and controlling the capacitances to attain equal values by means of feedback-controlling the electrostatic forces imposed between the movable transducing element and the second electrodes.

14. The method of claim 11, wherein the electric transducer potential indicates a sensed pressure.

15. The method of claim 11, wherein the electric transducer potential indicates a sensed acceleration.

16. The method of claim 11, further comprising the steps of providing a plurality of second electrodes having substantially equal effective areas and concentrically arranging said second electrodes.

17. The method of claim 11, further comprising the step of providing a plurality of second electrodes and utilizing a multiple element matrix of sub-electrodes for each of said second electrodes.

18. The method of claim 11, wherein the step of applying an opposed electric potential further comprises controlling said opposed electric potential by modulating the amplitude, width and/or frequency of a pulse voltage.

19. The capacitive transducer of claim 1, wherein said controller further comprises means for controlling a pulse voltage by modulating the amplitude, width and/or frequency of the pulse voltage.

20. The capacitive transducer of claim 1, wherein said transducing element is a dynamically moving transducing element.

* * * * *